US008566243B1

(12) United States Patent
Bharathula et al.

(10) Patent No.: US 8,566,243 B1
(45) Date of Patent: Oct. 22, 2013

(54) SECURE E-MAIL BILLING

(75) Inventors: Madhu Bharathula, Somerset, NJ (US); Shreeshah Vedagiri, Piscataway, NJ (US); Veera Inapakolla, Jersey City, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 339 days.

(21) Appl. No.: 12/837,097

(22) Filed: Jul. 15, 2010

(51) Int. Cl.
*G06Q 40/00* (2012.01)

(52) U.S. Cl.
USPC ................................ 705/44; 705/40; 705/1.1

(58) Field of Classification Search
USPC ................................................ 705/35–40, 44
See application file for complete search history.

(56) References Cited

U.S. PATENT DOCUMENTS

| | | | | |
|---|---|---|---|---|
| 6,292,789 | B1 * | 9/2001 | Schutzer | 705/40 |
| 6,385,595 | B1 * | 5/2002 | Kolling et al. | 705/40 |
| 6,483,599 | B1 | 11/2002 | Woodman et al. | |
| 6,493,685 | B1 * | 12/2002 | Ensel et al. | 705/40 |
| 6,701,315 | B1 | 3/2004 | Austin | |
| 7,698,151 | B2 | 4/2010 | Gozzo et al. | |
| 7,729,996 | B2 * | 6/2010 | Zito | 705/76 |
| 2002/0077978 | A1 * | 6/2002 | O'Leary et al. | 705/40 |
| 2003/0191711 | A1 * | 10/2003 | Jamison et al. | 705/40 |
| 2003/0208441 | A1 * | 11/2003 | Poplawski et al. | 705/40 |
| 2004/0088255 | A1 * | 5/2004 | Zielke et al. | 705/40 |
| 2004/0143546 | A1 * | 7/2004 | Wood et al. | 705/40 |
| 2005/0209965 | A1 * | 9/2005 | Ganesan | 705/40 |
| 2007/0005464 | A1 * | 1/2007 | Rosenblatt et al. | 705/35 |
| 2007/0239601 | A1 * | 10/2007 | Ganesan et al. | 705/40 |
| 2010/0057552 | A1 * | 3/2010 | O'Leary et al. | 705/14.27 |
| 2010/0121649 | A1 * | 5/2010 | Lynch et al. | 705/1.1 |
| 2010/0332393 | A1 * | 12/2010 | Weller et al. | 705/44 |

OTHER PUBLICATIONS

NETdelivery redefines electronic document delivery with rollout of new strategy, platforms. (Feb. 7, 2000). PR Newswire. Retrieved from http://search.proquest.com/docview/449428154?accountid=14753.*

Spiotto, A. H. (2001). Electronic bill payment and presentment: A primer. The Business Lawyer, 57(1), 447-473. Retrieved from http://search.proquest.com/docview/228463438?accountid=14753.*

(Continued)

*Primary Examiner* — Alexander Kalinowski
*Assistant Examiner* — Abhishek Vyas

(57) ABSTRACT

The instant application describes a Mobile Service Provider network configured to provide its users with a secure Electronic Mail ("E-mail") bill statement. The network includes first through third servers. The first server is configured to (i) receive, from a user, an enrollment request for a secure E-mail billing statement, the request including an E-mail address and account information and (ii) update the account of the user to reflect that the user has requested the secure E-mail billing statement. The second server is configured to (i) receive the request from the first server; (ii) generate an identifier for the request; (iii) store the request along with the identifier in a table; and (iv) validate the E-mail address of the user by sending an E-mail to the provided E-mail address, the E-mail includes the identifier. The third server is configured to (i) receive a response of the user to the E-mail sent by the second server, where the response includes the identifier and a password; (ii) validate the identifier via the second server; (iii) validate the password via the first server; and (iv) upon successful validations of the password and identifier, forward a successful authentication notice to the first server. The first server, upon receiving the successful authentication notice, is further configured to (iii) update the account of the user to reflect that the user has enrolled in the secure E-mail billing statement and (iv) request the second server to inform the user of the successful enrollment in the secure E-mail billing statement.

19 Claims, 6 Drawing Sheets

(56) References Cited

OTHER PUBLICATIONS

On consolidation model in e-bill presentment and payment; Vincent, Olufunke; Folorunso, Olusegun; Akinde, Ayodele. Information Management & Computer Security 17. 3 (2009): 234-247.*

Andreeff, A., Binmoeller, L. C., Boboch, E. M., Cerda, O., & al, e. (2003). Electronic bill presentment and payment: Is it just a click away?1. Business Credit, 105(9), 22-36. Retrieved from http://search.proquest.com/docview/230142085?accountid=14753.*

* cited by examiner

SECURE E-MAIL BILLING

TECHNICAL FIELD

The present subject matter relates to techniques and equipments for providing a secure E-mail billing service.

BACKGROUND

An important form of communication between businesses and customers has traditionally been "paper-based" communication, such as letters and bills mailed via a postal service. For example, it is estimated that 10 million subscribers of a Mobile Service Provider, such as, for example, Verizon Wireless™ network receive a paper bill and pay their monthly bill using checks. Merchants spend about $10 billion per year for printing and mailing of bills to customers. It is also estimated that banks account for about 6% of all first-class U.S. mail and that insurance companies and credit card companies account for about 4.5% and 4%, respectively.

However, significant interest has been expressed recently regarding alternative, non-paper methods of communication. The term "alternative messaging" refers to the distribution of information using alternative delivery media, including, but not limited to, facsimile transmissions (fax), electronic mail (e-mail), Internet, on-line banking, and the like. Alternative messaging may also be more cost effective than traditional paper-based communications, such as mail, not only because of the higher cost of paper, printing and postage, but also because of the speed of electronic communications.

Unfortunately, alternative messaging has to date been met with resistance from both businesses and consumers for various reasons. To illustrate, the customers of Mobile Service Providers such as, for example, Verizon Wireless™ use are provided with two paperless billing options. Either a customer can pay the bill through a web site of the company, or the customer can pay via the Internet banking program of their home banking web site. However, only 25% of the customer base in, for example, Verizon Wireless™ uses either of these two paperless, electronic-only, billing options. Therefore, a solution is needed to increase the percentage of paperless billing subscriptions.

SUMMARY

In one general aspect, the instant application describes a Mobile Service Provider network configured to provide its users with a secure Electronic Mail ("E-mail") bill statement. The network includes first through third servers. The first server is configured to (i) receive, from a user, an enrollment request for a secure E-mail billing statement, the request including an E-mail address and account information and (ii) update the account of the user to reflect that the user has requested the secure E-mail billing statement. The second server is configured to (i) receive the request from the first server; (ii) generate an identifier for the request; (iii) store the request along with the identifier in a table; and (iv) validate the E-mail address of the user by sending an E-mail to the provided E-mail address, the E-mail includes the identifier. The third server is configured to (i) receive a response of the user to the E-mail sent by the second server, where the response includes the identifier and a password; (ii) validate the identifier via the second server; (iii) validate the password via the first server; and (iv) upon successful validations of the password and identifier, forward a successful authentication notice to the first server. The first server, upon receiving the successful authentication notice, is further configured to (iii) update the account of the user to reflect that the user has enrolled in the secure E-mail billing statement and (iv) request the second server to inform the user of the successful enrollment in the secure E-mail billing statement.

The above general aspect may include one or more of the following features. For example, to reflect that the user has enrolled in the secure E-mail billing statement, the first server may be configured to include in the user's account an E-bill identifier indicating that the user has requested to receive the secure E-mail billing statement. The first server may be further configured to use the E-bill identifier to identify an account to receive the secure E-mail billing statement and send the secure E-mail billing statement to a user of the account once a bill for the user is generated. The user may not have an online account with the Mobile Service Provider network. Alternatively, the user may have an online account with the Mobile Service Provider network.

The E-mail sent by the second server may include a URL, which directs the user to a web page of the third server. The third server may request the password from the user. The first server may be a VISION server. The second server may be a Customer Care Enterprise Solutions server. The third server may be a My Company Server. The database may store preference data regarding notifications for various accounts. The preference data may include the users' preferences to receive the secure E-mail bill statement. The second server, upon receiving from the first server the request to inform the user of the successful enrollment, may be configured to update the database to reflect that future bill statements should be sent to the user via E-mail. The enrollment request may include a language preference of the user.

The network may further include a fourth server configured to allow the users to access their bill statements. The first server may be further configured to send a bill ready file to the fourth server. The bill ready file may identify accounts for which bill statements are ready and also identifies, among the identified accounts, the account that have requested to receive the secure E-mail bill statement. The fourth server may be configured to forward the identified account that has requested to receive the secure E-mail bill statement to the second server and request an E-mail notification for the identified account that has requested to receive the secure E-mail bill statement. The second server in response to the request from the fourth server may be configured to request from the third server an encrypted, password protected bill statement for the identified account that has requested to receive the secure E-mail bill statement. Upon receiving the encrypted, password protected bill statement from the third sever, the second server may be configured to E-mail the encrypted, password protected bill statement to an E-mail address provided by the use of the account.

If the E-mail to the user is bounced back, the second server may be further configured to request the fourth server to send to the user a print copy of the user's bill statement. The second server may be further configured to update the database to de-enroll the user from the secure E-mail billing statement. The first server, upon receiving a de-enrollment request, may be further configured to forward the de-enrollment request to the second server. The second server, in response, may be further configured to update the database to reflect the user's desire not to subscribe to the secure E-mail billing statement and forward a de-enrollment e-mail to the user. The account information may include an account number of the user at the Mobile Service Provider network.

Implementations of the described techniques may include hardware, a method or process, or computer software on a computer-accessible medium. The details of one or more implementations are set forth in the accompanying drawings and the description below. Other features will be apparent from the description and drawings, and from the claims.

With the foregoing techniques, the customer does not have to have an online account with the company in order to subscribe to paperless billing. This provides an easy way for the customer to opt from the paper billing to paperless billing and increase the percentage of paperless billing subscriptions. The benefit that may result from such solution includes a faster and more convenient way to pay bills and reduce paper clutter; saving natural resources and reducing greenhouse gas emission; and reducing the cost associated with paper billing for both the company and the customer.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
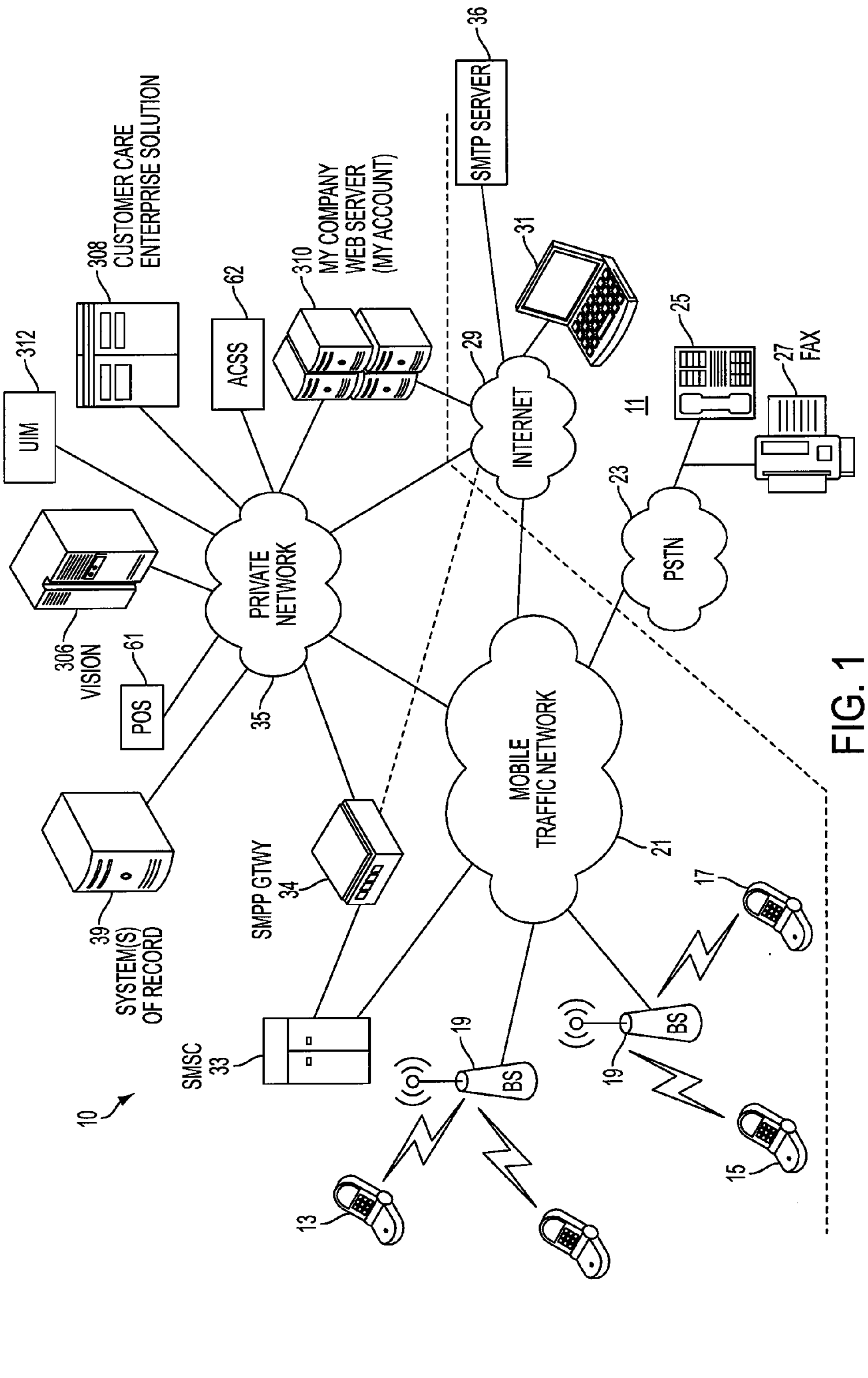
FIG. 1 illustrates a functional block diagram of a Mobile Service Provider network including elements/systems that may be utilized to enroll/de-enroller a customer of a Mobile Service Provider network in a secure E-mail billing service.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As noted above, the customers of a Mobile Service Provider may have two paperless billing options. In our earlier example, either a customer can pay a bill through a web site of the company, or the customer can pay via an Internet banking program offered by the customer's home banking web site. However, usually a small portion of customers use either of these two paperless, electronic-only, billing options. A solution is needed to increase the percentage of paperless billing subscriptions. To provide an easy and secure billing option to the customer, a secure E-mail billing service is discussed in this disclosure. The secure E-mail billing service allows customers to receive their monthly Verizon Wireless™ bill at their preferred email address. With this secure E-mail billing program, a consolidated electronic summary bill and a pay now payment option can be provided to a subscriber via E-mail. As such, the customer will be able to pay the bill using their checking account, quickly and securely, from within the E-mail bill. Furthermore, the customer is not required to have an online account with the company to be able to receive the secure E-mail bill statements.

The customer segment targeted for this third paperless and electronic billing option are the 10 million subscribers of, for example, Verizon Wireless™ who are receiving a paper bill and pay their monthly bill using checks. The customer can enroll in the secure E-mail billing service through at least three channels. For example, the customer may enroll in the secure E-mail billing service by visiting the web site of the company, by calling the customer care representative of the company, or visiting the store of the company. Once the customer enrolls in the secure E-mail billing service, a notification application of the Mobile Service Provider receives a request from one of the above three channels.

The notification application sends validation E-mail to the customer. The validation E-mail may include a link with secure token. When the customer clicks on the link, the customer is routed to My Company web page where customer has to authenticate by entering either billing system password or last four digits of his/her social security. After successful authentication, the customer will receive an enrollment welcome E-mail into the program. Also, the notification application updates the billing system with the remarks that customer has enrolled in the secure E-mail billing service. The notification application maintains preferred E-mail address and enrollment flag in a database to send monthly bills to the customer.

The customer can de-enroll from this program through one the same three channels used for enrollment. The billing system will send de-enrollment request to the notification application. The notification application sends de-enrollment E-mail to the customer and sends de-enrollment remarks to billing system.

After receiving the bill ready file from the billing system with secure E-mail billing indicator, the notification application will pull the customer's encrypted, password-protected PDF from My Company web server. The notification application will then attach the PDF to the respective E-mails for the enrolled customers. The E-mail will contain the instructions to the customer on how to open the PDF. To this end, an enrolled customer receives monthly secure E-mail bill at his/her preferred E-mail address. The customer may have to enter either billing system password or last four digits of his/her social security number to access the E-mail bill. After successful authentication, the customer can view the bill's details, pay the bill with Pay Now option, or pay with another account.

When customer clicks on any of the above-mentioned options, he/she will be routed to My Company web page for further payment processing. When the secure E-mail bill statement is returned once, then reprint request may be sent to an online application of the Mobile Service Provider in charge of allowing users to view and print their bills. If the secure E-mail bill is returned twice, then reprint request is sent to the online application and customer will be de-enrolled from the secure E-mail program. The billing system will be updated with the de-enrollment request and remarks from the notification application.

Figure 2:
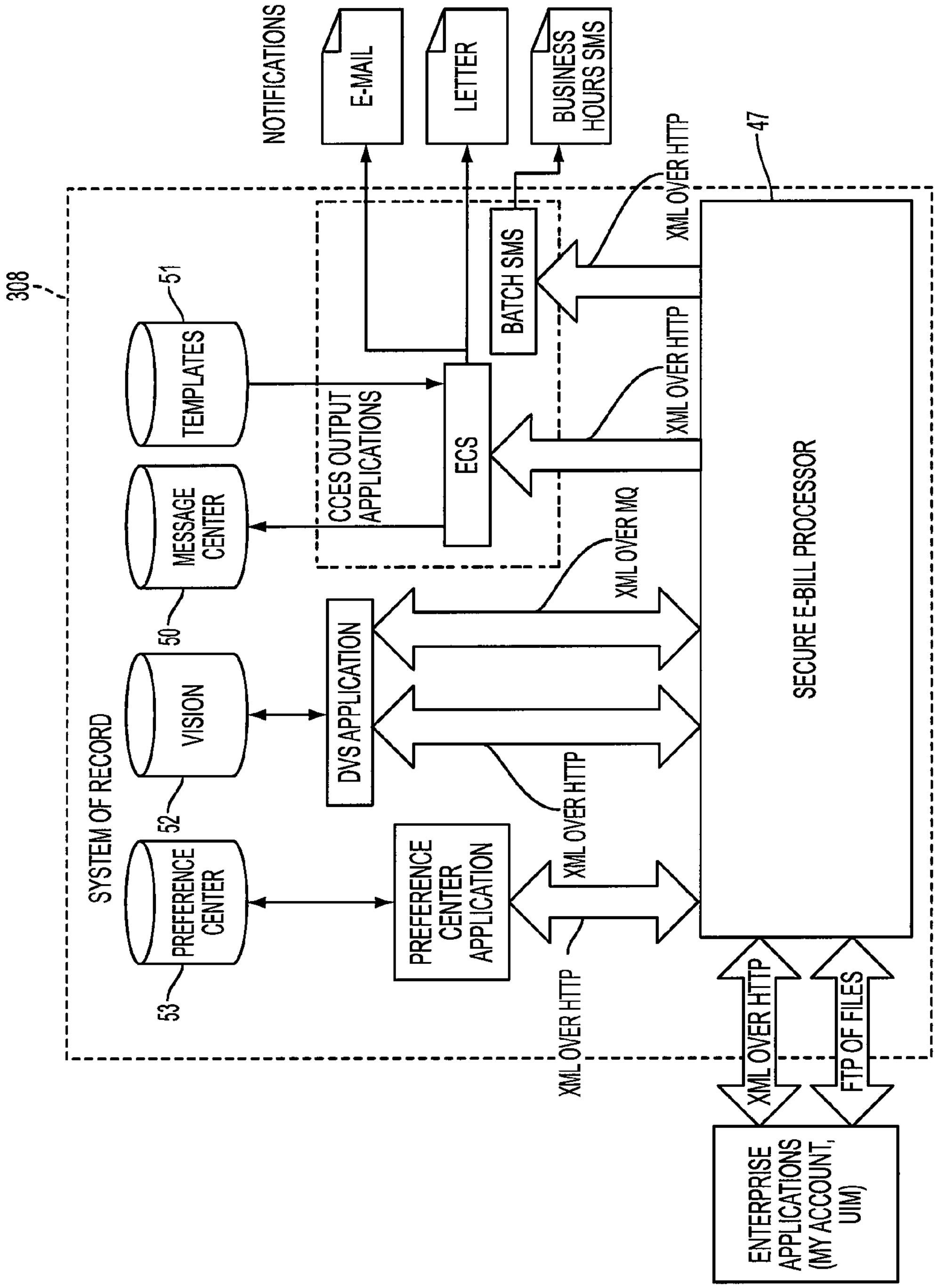
FIG. 2 illustrates software and associated functionalities, in block diagram form, where the software may be run on the hardware of one or more host or server type computers or systems of such computers, to implement a customer communication system shown in FIG. 1.
Figure 3:
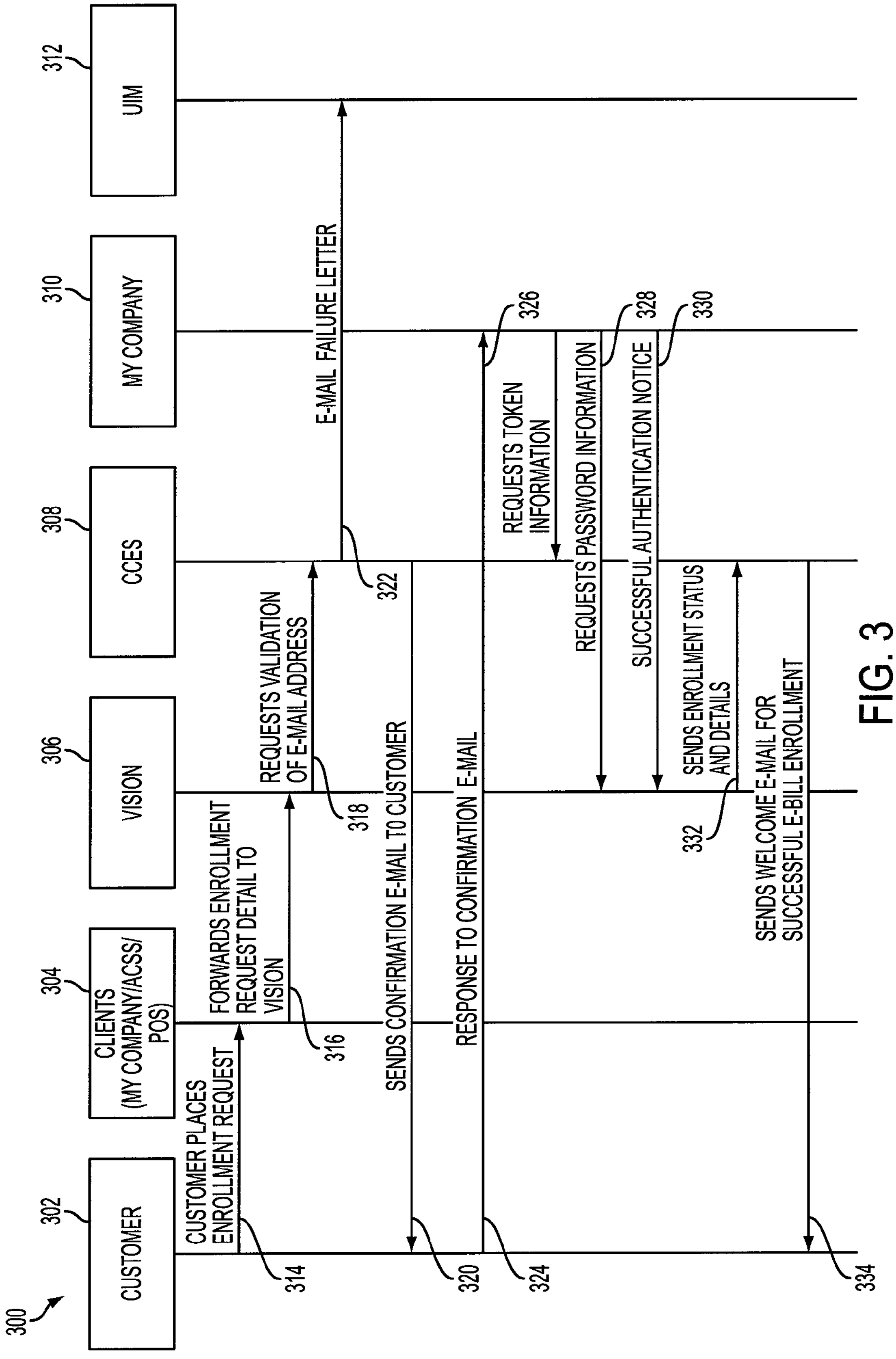
FIG. 3 illustrates an exemplary enrolling process for a secure E-mail billing service and interactions within the company's internal IT business applications of the Mobile Service Provider network shown in FIG. 1.
Figure 4:
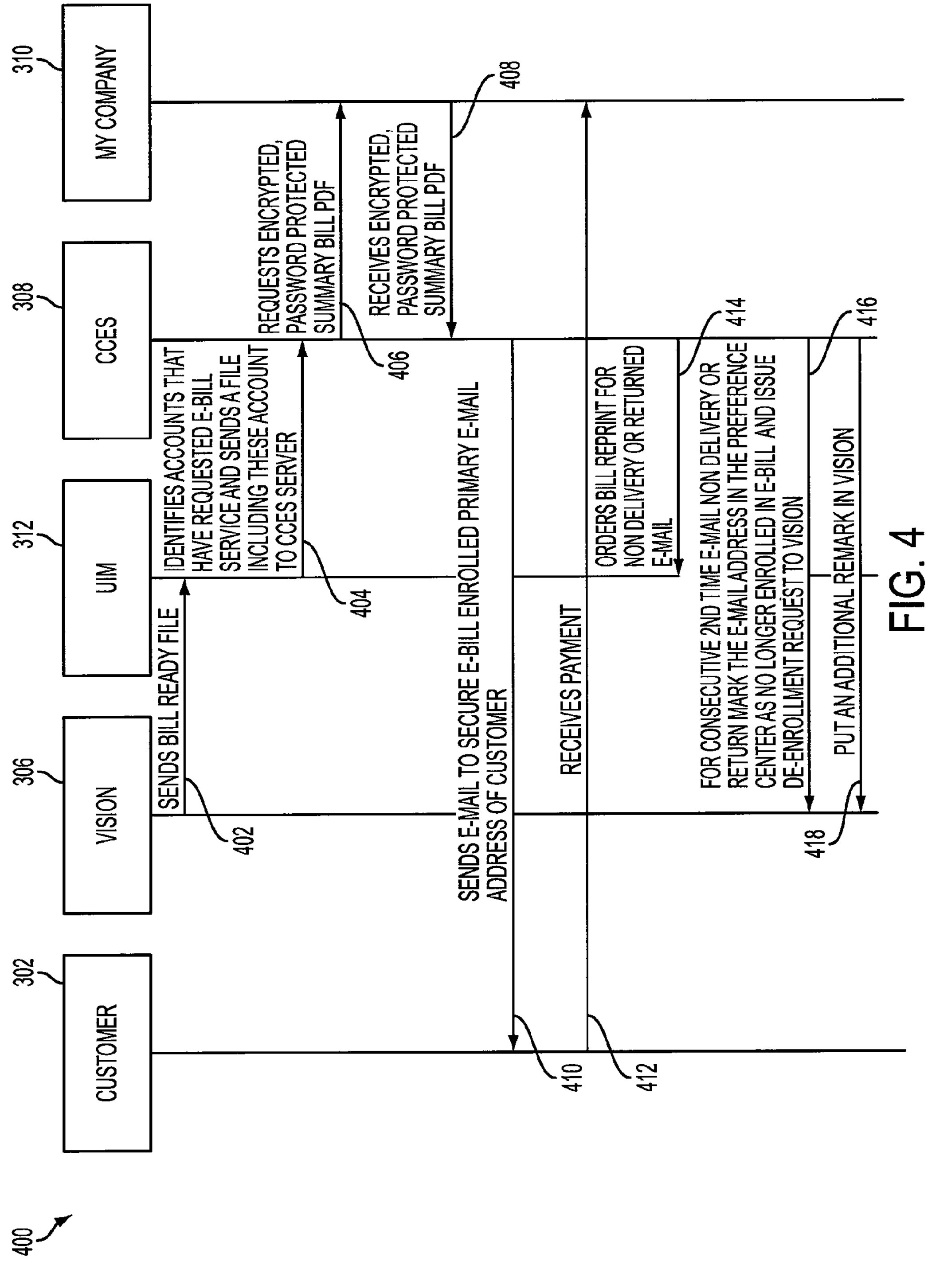
FIG. 4 illustrates an exemplary secure E-mail billing process and interactions within the company's internal IT business applications shown in FIG. 1.
Figure 5:
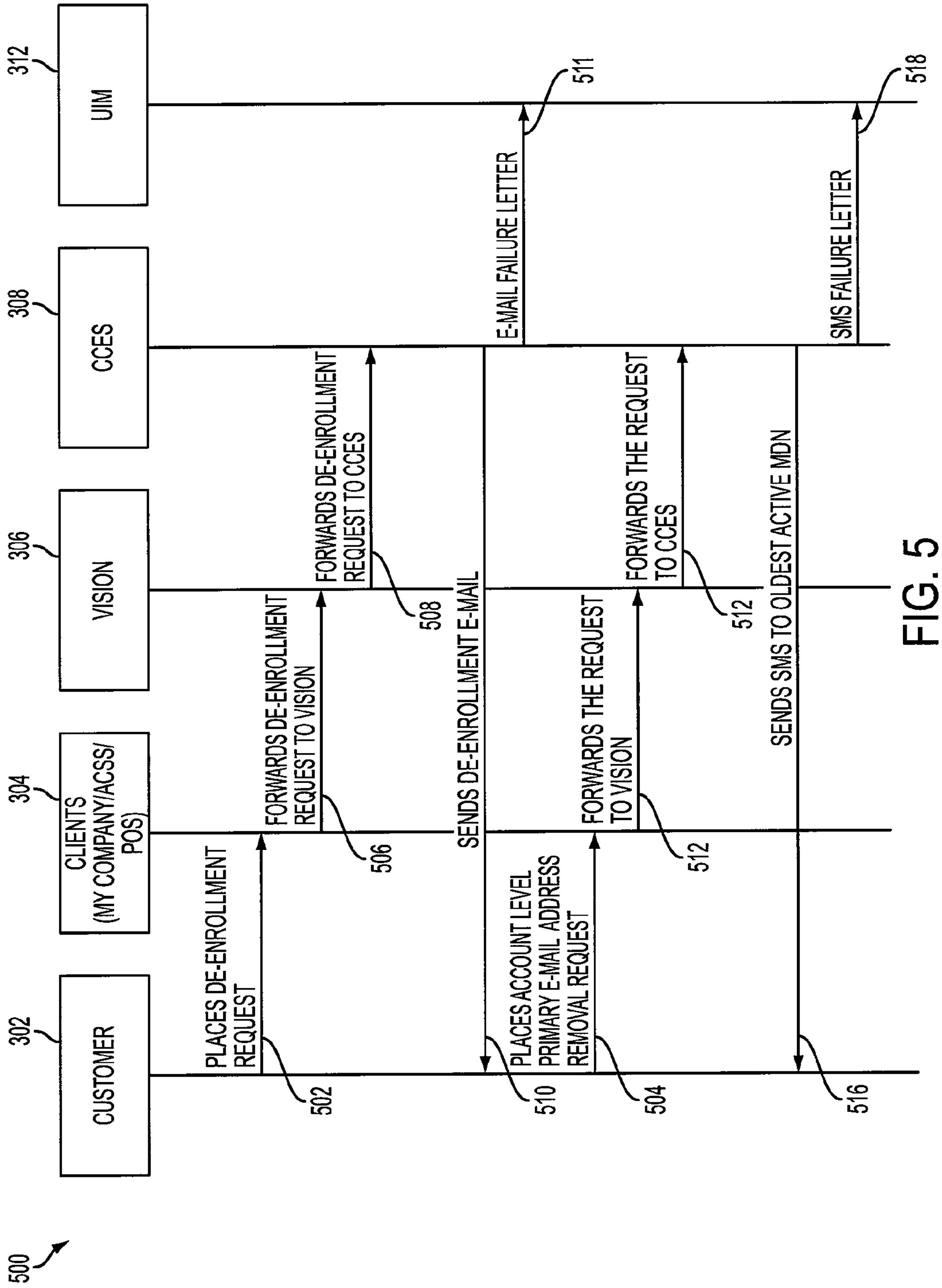
FIG. 5 illustrates an exemplary de-enrolling process for a secure E-mail billing service and interactions within the company's internal IT business applications of the Mobile Service Provider network shown in FIG. 1.

With this overview, FIG. 1 illustrates internal applications of the Mobile Service Provider that enable the secure E-mail billing process. FIG. 2 illustrates the server in charge of sending out the secure E-mail bill statements to customers. FIG. 3 illustrates an exemplary process for enrolling a customer of the Mobile Service Provider network in a secure E-mail billing service. FIG. 4 illustrates sending out the secure E-mail billing to customer. FIG. 5 illustrates an exemplary process for de-enrolling the customer of the Mobile Service Provider network from the secure E-mail billing service.

FIG. 1 illustrates a functional block diagram of a Mobile Service Provider network including elements/systems that may be utilized to enroll/de-enroller a customer of a Mobile Service Provider network in a secure E-mail billing service. A mobile communication network 10 may be operated by a carrier or service provider to provide a wide range of mobile communication services and ancillary services or features to its subscriber customers and associated mobile station ("MS") users. The elements indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations within networks and stations 11 outside the mobile communication network 10.

For purposes of later discussion, several mobile stations appear in the drawing, to represent examples of the mobile stations that may receive various services via the mobile communication network 10. Today, mobile stations typically take the form of portable handsets, smart-phones or personal digital assistants, although they may be implemented in other form factors. The network 10 allows users of the mobile stations to initiate and receive telephone calls to each other as well as through the public switched telephone network ("PSTN") and telephone stations connected thereto. The network 10 allows SMS type text messaging between mobile stations and similar messaging with other devices via the Internet. The network 10 typically offers a variety of other data services via the Internet, such as downloads, web browsing, email, etc. For these services, network 10 charges the user of the mobile stations and sends the users bills via mail and/or electronically as described in more detail with respect to FIGS. 2-5.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements, such as the MMSCs. A regional portion of the network 10, such as that serving mobile stations 13, 15 will typically include one or more RANs and a regional circuit and/or packet switched network and associated signaling network facilities.

Physical elements of a RAN operated by one of the mobile service providers or carriers include a number of base stations represented in the example by the base stations (BSs) 19. Although not separately shown, such a base station 19 typically comprises a base transceiver system ("BTS") which communicates via an antennae system at the site of base station and over the airlink with one or more of the mobile stations 13, 15, when the mobile stations are within range. Each base station typically includes a BTS coupled to several antennas mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 between the base stations and other elements with or through which the mobile stations communicate. Individual elements such as switches and/or routers forming the traffic network 21 are omitted here for simplicity.

A Mobile Directory Number ("MDN") or Mobile Telephone Number ("MTN") is the telephone number assigned to a mobile station, which a calling party or device inputs in order to call or send a message to the particular mobile station. To call the mobile station 15, for example, a user of a PSTN telephone or of another mobile station dials the MDN associated with the mobile station 15. To send a MMS message or a SMS message to destination mobile station 15, as another example, typically entails input of the MDN of that mobile station. A Mobile Identification Number ("MIN") is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations and is the number or address of the mobile station that appears in billing and account records and is accessible via web site or call-in account services.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. The drawing shows one FAX machine 27, by way of example, to illustrate the point that a subscriber or account holder notification may entail a facsimile transmission of the notification message to the subscriber's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, email, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer ("PC") at 31, by way of example. For purposes of discussing notifications, some notifications may entail an E-mail message transmission of the notification to the subscriber's data terminal, such as to the PC 29 via the Internet 29. To this end, network 10 includes Simple Mail Transfer Protocol ("SMTP") server 36 which is an E-mail transfer agent used for E-mail transmission. The SMTP server 36 uses SMTP protocol to send and receive E-mails from other E-mail transfer agents.

Wireless carriers developed the short message service ("SMS") to transmit text messages for display on the mobile stations. In many existing network architectures, the SMS traffic uses the signaling portion of the network 21 to carry message traffic between a Short Message Service Center ("SMSC") 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

The carrier will also operate a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. An example of such a system 39 is a billing system, which includes subscriber account records. A large carrier typically has a number of such systems, and the system that stores the account data for a particular subscriber may be referred to as the "system of record" for that subscriber's account.

Of note for purposes of this discussion, the network 10 supports service or account related notifications to end users. At least some notification requests may be generated upon change to an operational control parameter of the customer's mobile station. Other notifications may be generated monthly for example based on the services offered to the subscribers. Some of the notifications may be sent to various mobile stations using SMS capabilities of the network 10. Other notifications may be sent to the users of the various mobile stations through mails. Still other notifications may be sent to the users of the various mobile stations through a secure E-mail service. For example, when there is a change in a subscriber's account warranting notification, then the network 10 will provide an appropriate notification in the form of an SMS message sent via the SMPP gateway 34, the SMSC 33, the traffic network 21, one of the base stations 19 and a signaling channel over the air link to the mobile station 13 of the subscriber/account holder.

For another example, when monthly bill is generated, then the network 10 will provide an appropriate notification in the form of an E-mail to the user of the mobile station by using various internal IT applications such as, for example, a Virtual Information System Integrated Online Network ("VISION") server 306, a Customer Care Enterprise Solution ("CCES") server 308, My Company web server 310, and a Universal Invoice Module ("UIM") server 312. The VISION server 306 includes the main billing system used to house customer information and make changes to a customer's service profile. The CCES server 308 receives notification requests from various other carrier systems and generates and sends the requested notifications. In some cases, the CCES server 308 also updates information in system(s) of record, as part of its processing in response to the notification requests. In one example, the CCES server 308 generates and sends a secure E-mail bill statement to an E-mail address of the user who has enrolled to receive a secure E-mail billing service. In the examples discussed in more detail below, the CCES server 308 also supports alternative messaging, for example, in the form of facsimile, voice or SMS messages, and/or letter mailings which are used for informing the user of his/her monthly bill. The CCES server 308 is described in more detail with respect to FIG. 2.

In practice today, the carrier will offer its subscribers online access to a variety of functions related to the subscribers' accounts, such as review of billing statements and usage data, on-line payment, subscription changes, password control or the like. For that purpose, the carrier in our example operates My Company web server 310, offering a 'My Account' type subscriber interface via the Internet. Hence, a user's terminal, such as PC 31, may be used to access on-line information about a subscriber's account, which the mobile carrier makes available via the carrier's My Account web site accessible through the Internet 29. Of note for purposes of the present discussions of notifications, the web site provides secure user access to enter and/or otherwise change various aspects of the subscriber's account related information. The website also may allow the subscriber to designate the E-mail address at which the account holder would like to receive notification.

The UIM server 312 is an online application that allows users to view exact replicas of the customer invoice, request customer reprints, and print "draft quality" reprints to a local printer. The VISION server 306, CCES server 308, My Company web server 310, and UIM server 312 interact with each other in a unique manner to provide a user with a secure E-mail billing service as described in more detail with respect to FIGS. 3 and 4.

The user of the mobile stations may register for the secure E-mail billing service through various clients of the network 10. The clients of the network 10 include My Company web page, Automated Customer Support System ("ACSS") 62, and/or Point of Service/Sale ("POS") 61. My Company web page may be hosted at the My Company web server 310 and may include a web page of the Mobile Service Provider through which the customer can access his/her records. The ACSS 62 is an application for handing customer calls and is the front-end system to VISION server 306. The POS 61 may refer to channels that sell products (e.g., mobile phones) of the Mobile Service Provider to the customer. The user of the mobile station can access one of the clients of the network 10 to place a request for the secure E-mail billing service as described in more detail with respect to FIG. 3.

For some notifications, the network 10 may determine if the E-mail transmission successfully provided notification to the mobile station 13, and if not, initiate one or more alternative notification procedures to other destinations designated for possible notice to the particular subscriber/account holder. For example, if the E-mail is bounced back, the network 10 instructs UIM server 312 to notify the user by sending a letter to the user's home address.

The VISION server 306 is configured to send a bill ready file to UIM server 312 at the end of each billing cycle. The bill ready file includes an E-bill indicator for the accounts that have requested to receive the secure E-mail billing service. In one implementation, VISION server 306 references the user preference center to identify the accounts that have requested to receive the secure E-mail billing service and marks the file accordingly. After receiving the file, UIM server 312 uses the E-bill indicator to identify the accounts that have requested E-mail billing service and sends a file including the accounts that have requested E-mail billing service along with a notification request to CCES server 308, which will cause CCES server 308 to send one or more notifications. For the remaining accounts which have not requested E-mail billing service, UIM server 312 may generate a paper copy of the bill statement and forward it to the customer.

After receiving the file including the accounts that have requested E-mail billing service, Secure E-bill processor in CCES sever 308 forwards the file to My Company server 310 and requests encrypted, password protected summary bill for each of the identified accounts. Once CCES server 308 receives the encrypted password protected summary bill PDF from My Company server 310, the Secure E-bill processor generates an E-mail message to notify the subscriber. The E-mail message includes as an attachment the encrypted, password protected summary bill. The Secure E-bill processor may also send an SMS message to the user's mobile station, informing the user that his/her electronic bill is ready for viewing. The Secure E-bill processor may glean the information identifying the destination of the SMS message and the E-mail address from the system of record (e.g., VISION system of record 52 or Preference Center 53). In one example, VISION system of record 52 and/or Preference Center 53 include the E-mail address at which the user would like to receive his/her electronic bill statement.

FIG. 2 depicts software and associated functionalities, in block diagram form, where the software may be run on the hardware of a host or server type computer or system of such computers, to implement CCES server 308; and that drawing illustrates several other elements that communicate with that system for providing notifications to mobile users, including those provided for secure E-mail billing service. For example, the drawing shows the systems of record 39, which may include the VISION system of record 52 and the Preference Center 53. In the example, CCES server 308 is implemented as an enterprise middleware web service written in Java that receives notification requests in the form of FTP and XML via HTTP, and follows business rules to send customer notifications and update systems of record. In general, these communications may utilize the CCES web services to facilitate the sending of text message, E-mail, letter, and fax notifications. Hence, CCES server 308 may be implemented as middleware, that is to say, in this example, as software for implementing a Secure E-bill processor 47, one or more databases 50, 51, system of record 52, 53, as will be discussed in more detail below.

Although shown as a common platform at 308 in FIG. 1, the elements of the CCES server 308 of FIG. 2 may be implemented on separate hardware communicating with each other via a network the same as or similar to network 35. For example, one or more of the databases 50, 51 and system of record 52, 53 typically will be implemented as separate servers in communications with the hardware platform(s) implementing the Secure E-bill processor 47, although they may be implemented as records and appropriate application software running on the same computer as the middleware for the Secure E-bill processor 47. The Preference Center directory 53, for example, may be implemented as a Lightweight Directory Access Protocol ("LDAP") server coupled for communication with the computer running the Secure E-bill processor 47 programming. For another example, the VISION system of record 52 may be implemented in VISION server 306 and may be in communication with the Secure E-bill processor 47 through network 35.

The Secure E-bill processor 47 receives notification requests, processes them and provides the processed requests to associated messaging applications that send the desired notifications out via one or more delivery techniques. In the illustrated implementation, the Secure E-bill processor 47 provides such notification services for a number of enterprise applications including My Company running on the web server 310, ACSS 62, and POS 61. For example, enterprise applications such as My Company running on the web server 310 may trigger E-mail billing notifications when a customer uses his/her online account through server 310 to enroll in a secure E-mail billing service. For another example, enterprise applications such as My Company running on the web server 310, ACSS 62, or POS 61 may trigger E-mail billing notifications though VISION system of record 52 when a customer who may not have an online account with the Mobile Service Provider uses one of these applications to enroll in the secure E-mail billing service. In any such case, the Secure E-bill processor 47 will send a notification to the customer following specific notification logic and provide fallout files by area when the notification cannot be made.

The CCES server 308 will include or have communication access to a number of databases that store information used in performance of various notification related functions. In the example, CCES server 308 includes a database 50 of message center and a database 51 of notification message templates. The database 51 provides the format and common content, e.g. forms or templates, for the various notification messages sent out by the CCES server 308. The Preference Center 53 is part of the system of record for communication preferences and account holder designation. Communications with this system of record 53 provide the Secure E-bill processor 47 with information that is useful in processing of various notifications, including notifications regarding account. The Secure E-bill processor 47 can communicate with the Preference Center 53 using XML to store and retrieve the preference and account holder data from the Preference Center 53.

Thus, the Preference Center directory 53 stores preference data regarding notifications for various network customer accounts that may be subject to notifications. The Preference Center directory 53, for example, stores the MDN of the account holder as designated by the subscriber. Similarly, the Preference Center directory 53 may store the MDN of the mobile station on which the subscriber would like to receive various notifications. Additionally, the Preference Center directory 53 may register the user's preference in receiving the user's monthly bill statements via a secure E-mail. Also, the Preference Center directory 53 may include the E-mail address at which the user would like to receive his/her monthly bill statements. The directory may store other notification preference information for the subscriber account, for account change notifications and/or for other notifications that the carrier may want to provide to the subscriber, such as for example, notification related to a change in operational control parameter of the customer's mobile station. The language for the notification also may be specified in the Preference Center directory 53. The Secure E-bill processor 47 communicates with the Preference Center application that updates its directory 53 using the LDAP.

The VISION system of record 52 is also part of the system of record for communication preferences and account holder designation. The VISION system of record 52 houses customers' billing information. The VISION system of record 52 may act as an interface between the enterprise applications through which the customer places a request for secure E-mail billing service. The Secure E-bill processor 47 may communicate with VISION system of record 52 in the form of XML over HTTP and may receive notification request from VISION system of record 52 in the form of XML over MQ. The Secure E-bill processor 47 will send a notification to the customer following specific notification logic and provide fallout files by area when the notification cannot be made.

To this end, CCES server 308 also runs one or more message output applications, identified as CCES output applications in FIG. 2, for processing the notification request messages output from the Secure E-bill processor 47, as needed to generate and send the actual notification messages through one or more communication delivery channels. The Secure E-bill processor 47 modifies notification request messages based on its processing and outputs the modified notification request messages in XML format to the appropriate one or more of the CCES output applications, to send the actual notifications. The CCES output applications comprise application programming software, which may run on the same or a different computer from the Secure E-bill processor 47.

The CCES output applications enable the CCES server 308 to provide notifications, including notifications regarding account changes, and secure E-mail notifications for bill statements as shown by way of example to the right of FIG. 2. Some messages may be batch processed for SMS communications. Batch SMS communications may be limited to business hours if desired or sent at any time of the day. The CCES server 308 supports other types of notifications, such as letter or E-mail transmissions via an Enterprise Communication Services ("ECS") function. For example, the ECS function may process a request for sending an E-mail to the customer regarding his/her monthly bill statement. To this end, the E-mail may be forwarded from the CCES server 308 to the SMTP server (e.g., server 36) for delivery to the PC 31 of the customer.

The CCES server 308 could be implemented on a single hardware platform. However, to provide effective notification services for a large number of customers and a large volume of trigger events or enterprise applications requiring notification, including various account data changes, the CCES server 308 may utilize a distributed system architecture. The exemplary system architecture will be highly available and fault tolerant. Those skilled in the art will recognize, however, that other system architectures may be used; e.g. to meet the demands of increased event and notification traffic for account changes and/or other enterprise applications that require customer notifications.

The CCES software for notification services may be written in Java. The Secure E-bill software, for example, makes the preference center lookup on the account number provided in the notification request to identify the E-mail address for the account number that should receive the secure E-mail bill statement. The Secure E-bill software also updates preference center records for subscribers to reflect account changes responsive to account registration and notification preferences responsive to notification requests.

FIG. 3 illustrates an exemplary process 300 for enrolling a customer of a Mobile Service Provider network in a secure E-mail billing service. The process 300 includes an interaction between customer 302 and the Mobile Service Provider's internal IT business applications. The internal IT business applications include clients 304, VISION server 306, CCES server 308, My Company web server 310, and UIM server 312. These applications were described in detail with respect to FIGS. 1 and 2. Therefore, for the sake of brevity, they are not described here in more detail.

The process 300 begins with customer 302 placing an enrollment request though one of clients 304 of Mobile Service Provider network (314). The clients 304 include My Company web server 310, ACSS 62, and/or POS 61. The customer 302 can access one of clients 304 to place a request for a secure E-mail billing service. For example, the customer can access My Company web page hosted at My Company server 310 and selects the secure E-mail billing service. In one example, My Company web page may include an icon for such service. The activation of the icon may result in displaying a particular user interface designed for registering the user for secure E-mail billing service. The user interface may one or more fields soliciting information about the user's account, E-mail address, and language preference for the bill statements. The account information may include the mobile account of the user. The E-mail address may include the E-mail address at which the user wishes' to receive his/her future bill statements. After completing the one or more fields in the user interface, the user may select a submit button to forward the requested information to the Mobile Service Provider network. The user may or may not have an online account with the My Company web server 310.

In a slightly different implementation, the user may enroll in a secure E-mail billing service through ACSS or POS. For example, the user may call the customer service center of the Mobile Service Provider and request the secure E-mail billing service. Alternatively, the user may visit the store of the Mobile Service Provider to request the secure E-mail billing service. In either case, the request is forwarded to VISION server 306 (316). The VISION server 306 may first determine whether the account is eligible to receive E-mail bill statements. For example, VISION server 306 may determine if the account is past due. If so, VISION server 306 may inform the user and request that the user make the account current before further action. Upon determining that the account is eligible for secure E-mail billing service, VISION server 306 may put remarks on the account reflecting that the user has requested to enroll in the secure E-mail billing service.

The VISION server 306 seeks validation of the provided E-mail address from CCES server 308 (318). To this end, VISION server 306 may forward the user's account information and E-mail address to CCES server 308. The CCES server 308 receives the request from VISION server 306, generates an identifier for the request, and stores the request along with the identifier in a database. The identifier may be used to match responses to their corresponding requests. To validate the E-mail address, CCES server 308 sends an E-mail to the provided E-mail address (320). If the E-mail is bounced back, CCES server 308 informs UIM server 312 of E-mail failure (322) and requests UIM server 312 to generate a paper bill for the user. Similarly, CCES server 308 may inform VISION server 306 of the invalidity of the E-mail address. Upon receiving this information, VISION server 306 does not enroll the user for the secure E-mail billing service and requests CCES server 308 to inform the user of the same. The VISION server 306 also updates the account information to reflect that the requested enrollment was unsuccessful.

The E-mail may include a URL, which once activated takes the user to the My Company web page. The E-mail may also include the identifier generated by CCES server 308 embedded therein. Once the E-mail reaches the user at the destination E-mail address, the user may click on the URL to confirm the request. Clicking on the URL opens a web page provided by My Company server 310 and sends a confirmation E-mail to My Company server 310 (324). The confirmation E-mail includes the identifier generated by the CCES server 308. The My Company server 310 may request password information from the user to authenticate the user. In one example, if the user has an online account with the Mobile Service Provider, the Mobile Service Provider requests that the user provides his/her online password. In another example, if the user does not have an online account with the Mobile Service Provider, the Mobile Service Provider requests that the user provides his/her last four digits of social security number.

To authenticate the user provided password and identifier, My Company server 310 requests from CCES server 308 the identifier information (326) and from VISION server 306 the password information (328). Alternatively, if the user has an online account with the Mobile Service Provider, My Company server 310 may have the user's password information and may not request this information from VISION server 306. The My Company server 310 may provide the account information associated with the user to CCES server 308 and the VISION server 306 and requests the necessary credentials required for authentication the user. Upon receiving the identifier information from CCES server 308 and the password information from VISION server 306, My Company server 310 attempts to validate the user provided password and the identifier embedded in the confirmation E-mail. If authentication is not successful, My Company server 310 displays error message to the user and allows the user for authentication of up to five times, for example. Once the user has tried five times and has failed the authentication, My Company server 310 may inform VISION server 306, which may not enroll the user in the secure E-mail billing service. The VISION server 306 may also request that CCES 308 generates an E-mail to the user informing the user of the same.

Once the authentication is successful, My Company server 310 updates VISION server 306 and VISION server 306 updates CCES server 308 for enrollment completion. In particular, My Company server 310 sends a successful authentication notice to VISION server 306 (330). In response, VISION server 306 updates account information of the user to reflect that the user has successfully enrolled in the secure E-mail billing service and sends enrollment status information to CCES server 308 (332). The VISION server 306 may request that CCES server 308 inform the user of the successful enrollment in the secure E-mail billing service. In response, CCES server 308 sends a welcome E-mail for successful enrollment in E-mail billing service to the user (334). Additionally, CCES server 308 may update its database to reflect that the user has enrolled to receive secure E-mail bill statements in future.

FIG. 4 illustrates an exemplary secure E-mail billing process 400 interactions within the company's internal IT business applications. The internal IT business applications include VISION server 306, CCES server 308, My Company server 310, and UIM server 312. These applications were described in detail with respect to FIGS. 1 and 2. Therefore, for the sake of brevity, they are not described here in more detail. The process 400 begins with VISION server 306 sending a bill ready file to UIM server 312 (402). The bill ready file includes the list of accounts for which the bill statement is ready. Additionally, the bill ready file includes an E-bill indicator for the accounts that have requested to receive the secure E-mail billing service. In one implementation, VISION server 306 references the accounts information—updated during enrollment—to identify the accounts that have requested to receive the secure E-mail billing service and marks the file accordingly.

After receiving the file, UIM server 312 using the E-bill indicator identifies the accounts that have requested E-mail billing service and sends a file identifying those accounts to CCES server 308 (404). For the remaining accounts which have not requested E-mail billing service, UIM server 312 may generate a paper copy of the bill statement and forward it to the customer. After receiving the file identifying the accounts that have requested E-mail billing service, CCES sever 308 forwards the file to My Company server 310 and requests encrypted, password protected summary bill for each of the accounts (406). The CCES server 308 receives the encrypted password protected summary bill PDF from My Company server 310 (408) and sends an e-mail with the bill summary attachment to the secure e-bill enrolled primary E-mail address of each of the customers associates with the accounts (410). Thereafter, the customer may view the statement and make payments through several payment options. The payment options include mailing a check to the Mobile Service Provider or simply clicking on a "Pay Now" icon provided in the E-mail which redirects the user to the My Company web site and allows the user to pay his/her monthly bill.

With respect to a particular account for which the secure E-mail is bounced back, CCES server 308 orders UIM server 312 to send to the customer a paper copy of the bill (414). If the secure E-mail is returned twice, CCES server 308 updates its database to de-enroll the account and sends a de-enrollment request to VISION server 306 (416). Additionally, CCES server 308 may place additional remarks in VISION server 306 (418).

FIG. 5 illustrates an exemplary de-enrollment process 500 and interaction with the Mobile Service Provider's internal IT applications. The internal IT business applications include clients 304, VISION server 306, CCES server 308, and UIM server 312. These applications were described in detail with respect to FIGS. 1 and 2. Therefore, for the sake of brevity, they are not described here in more detail. The de-enrollment process 500 may begin with customer 302 placing a de-enrollment request (502) or placing an account level primary E-mail removal request (504). These processes are similar. Below, first the de-enrollment process through placement of the de-enrollment request is described in detail, and then the de-enrollment process through placement of the account level primary E-mail removal request is described. For the sake of brevity, the redundant aspects of the latter de-enrollment process are not described.

The process 500 may begin with customer 302 placing a de-enrollment request though one of clients 304 of Mobile Service Provider network (502). The clients 304 include My Company web page, ACSS, and/or POS. The customer 302 can access one of clients 304 to place the de-enrollment request. For example, customer 302 can access My Company web page hosted at My Company server 310 and requests de-enrollment from the secure E-mail billing service. My Company web page may include an icon for such request. In a slightly different implementation, customer 302 may de-enroll from the secure E-mail billing service through ACSS or POS. For example, customer 302 may call the customer service center of the Mobile Service Provider network and request to de-enroll from the secure E-mail billing service. Alternatively, customer 302 may visit the store of the Mobile Service Provider to make a de-enrollment request.

In either case, the request is forwarded to VISION server 306 (506). The VISION server 306 receives the request, validates, and updates the account to reflect the customer's desire not to receive E-mail billing service. Similar to the enrollment process 300, VISION server 306 may first determine eligibility of the account before further processing. For example, VISION server 306 may determine if the account is past due. If so, VISION server 306 may inform the user of the same and may request that the user make the account current before further action. Upon determining that the account is eligible, VISION server 306 may put remarks on the account reflecting that the user has requested to de-enroll from the secure E-mail billing service. Then, VISION server 306 may forward the de-enrollment request to CCES server 308 (508). Along with the request, VISION server 306 may forward the user's account information to CCES server 308. The CCES server 308 uses the account information to update its database for that account, e.g., removing the indicator to receive E-mail billing service. The CCES server 308 sends a de-enrollment E-mail to customer 302 (510), informing customer 302 of successful de-enrollment from the secure E-mail billing service. If the E-mail is bounced backed, CCES server 308 informs UIM server 312 and requests UIM server 312 to send a letter to the customer to inform the customer of successful de-enrollment from secure E-mail billing service (511).

As noted above, the de-enrollment process may also be initiated by customer 302 placing account level primary E-mail address removal request (504). Similar to the previous process, the requests is forwarded to VISION server (512), which in turn forwards the requests to CCES server 308 (514). Unlike the previous de-enrollment process, instead of sending an E-mail, CCES server 308 sends a SMS message to the MDN associated with the mobile station of customer 302 to inform customer 302 of successful de-enrollment from secure E-mail billing service (516). If the SMS is bounced backed, CCES server 308 informs UIM server 312 and requests UIM server 312 to send a letter to the customer to inform the customer of successful de-enrollment from secure E-mail billing service (518).

As shown by the above discussion, functions for enabling enrollment and/or de-enrollment in a secure E-mail billing service may be implemented on computers connected for data communication via the components of a packet data network. Although special purpose devices may be used, such devices also may be implemented using one or more hardware platforms intended to represent a general class of data processing device commonly used to run "server" programming so as to implement the seamless access to the particular domain functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network, interface cards or ports for communication purposes. The software functionalities involve programming, including executable code as well as associated stored data, e.g. files used for enabling enrollment and/or de-enrollment in a secure E-mail billing service. The software code is executable by the general-purpose computer that functions as the server corresponding to the domains of the enterprise. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling enrollment and/or de-enrollment in a secure E-mail billing service, in essentially the manner performed in the implementations discussed and illustrated herein.

Figure 6:
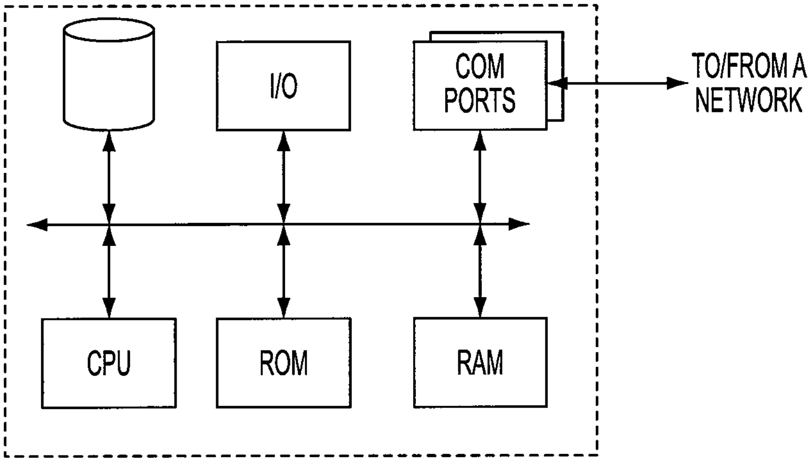
FIG. 6 is a simplified functional block diagram of a computer that may be configured as a host or server, for example, to function as the VISION server in the system of FIG. 1.
Figure 7:
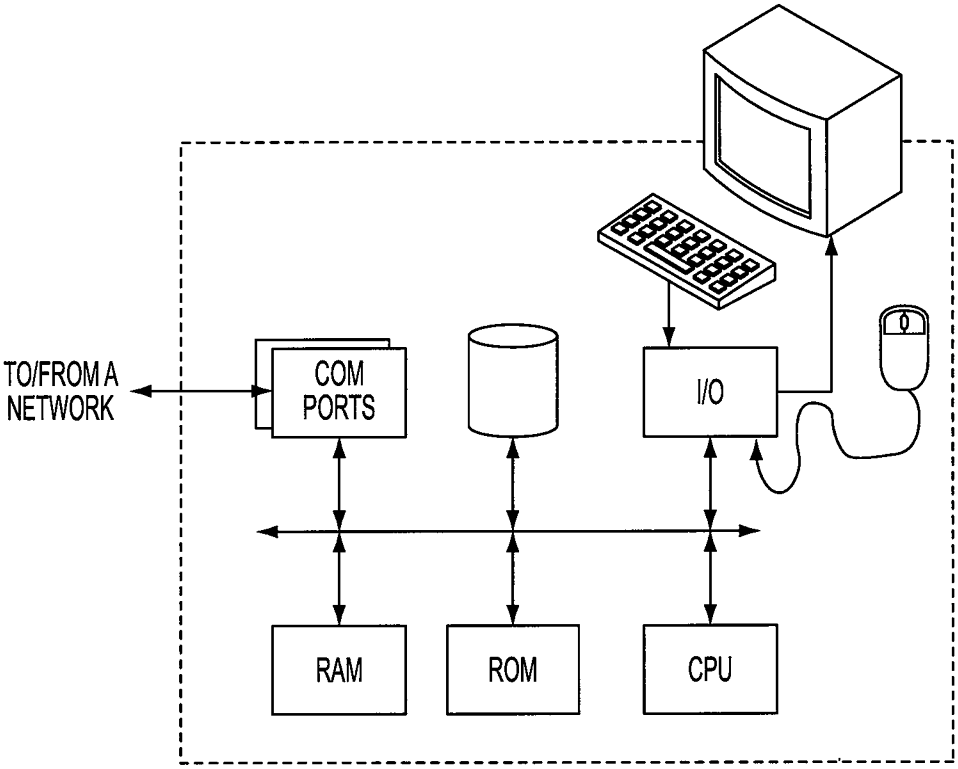
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a user terminal or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Similarly, a user terminal includes a data communication interface for packet data communication. The user terminal also includes a CPU, in the form of one or more processors, for executing program instructions. The user terminal platform typically includes an internal communication bus, program storage and data storage for various data files to be processed and/or communicated by the user terminal. The hardware elements, operating systems and programming languages of such user terminal are conventional in nature, and it is presumed that those skilled in the art are adequately familiar therewith. Of course, the user terminal functions may be implemented in a distributed fashion on a number of similar platforms, to distribute the processing load.

Hence, aspects of the methods for enabling a user to enroll and receive secure E-mail billing and to de-enroll therefrom as outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, may be used to implement the process shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is understood that various modifications may be made to the disclosed subject matter and that the disclosed subject matter may be implemented in various forms and examples, and that the teachings may be applied in numerous applications, only some of which have been described herein.

What is claimed is:

1. A Mobile Service Provider network configured to provide its users with a secure Electronic Mail ("E-mail") billing statement, the network comprising:

a first server configured to (i) receive, from a user, an enrollment request for a secure E-mail billing statement, the request including an E-mail address and account information and (ii) update the account of the user to reflect that the user has requested the secure E-mail billing statement;

a second server configured to (i) receive the request from the first server; (ii) generate an identifier for the request; (iii) store the request along with the identifier in a table; and (iv) validate the E-mail address of the user by sending a validation E-mail to the provided E-mail address, the validation E-mail including the identifier; and a third server configured to authenticate an association between the user and the E-mail address to which the validation E-mail was sent by the second server by performing functions to (i) receive a response of the user to the validation E-mail sent by the second server, the response including the identifier and a password requested by the third server; (ii) validate the identifier via the second server; (iii) validate the password via the first server; and (iv) upon successful validations of the password and identifier, forward a successful authentication notice of the association between the user and the E-mail address to the first server, wherein:

the first server, upon receiving the successful authentication notice of the association between the user and the E-mail address, is further configured to (iii) update the account of the user to reflect that the user has enrolled in the secure E-mail billing statement and (iv) request the second server to inform the user of the successful enrollment in the secure E-mail billing statement.

2. The network of claim 1, wherein to reflect that the user has enrolled in the secure E-mail billing statement, the first server is configured to include in the user's account an E-bill identifier indicating that the user has requested to receive the secure E-mail billing statement, and the first server is further configured to use the E-bill identifier to identify an account to receive the secure E-mail billing statement and send the secure E-mail billing statement to a user of the account once a bill for the user is generated.

3. The network of claim 1, configured so that the user does not have an online account with the Mobile Service Provider network.

4. The network of claim 1, configured so that the user has an online account with the Mobile Service Provider network.

5. The network of claim 1, wherein:

the E-mail sent by the second server includes a URL, which directs to a web page of the third server, and the third server requests the password from the user via the web page.

6. The network of claim 1, wherein:

the first server is a Virtual Information System Integrated Online Network (VISION) server, the second server is a Customer Care Enterprise Solutions server, and the third server is a My Company Server.

7. The network of claim 1, wherein:

the database stores preference data regarding notifications for various accounts, and the preference data include the users' preferences to receive the secure E-mail billing statement.

8. The network of claim 7, wherein:

the second server, upon receiving from the first server the request to inform the user of the successful enrollment, is configured to update the database to reflect that future billing statements should be sent to the user via E-mail.

9. The network of claim 1, wherein the enrollment request includes a language preference of the user.

10. The network of claim 1, further comprising a fourth server configured to allow the users to access their billing statements, wherein:

the first server is further configured to send a bill ready file to the fourth server, wherein the bill ready file identifies accounts for which billing statements are ready and also identifies, among the identified accounts, the account that has requested to receive the secure E-mail billing statement, the fourth server is configured to forward the identified account that has requested to receive the secure E-mail billing statement to the second server and request an E-mail notification for the identified account that has requested to receive the secure E-mail billing statement, the second server in response to the request from the fourth server is configured to request from the third server an encrypted, password protected billing statement for the identified account that has requested to receive the secure E-mail billing statement, and upon receiving the encrypted, password protected billing statement from the third server, the second server is configured to E-mail the encrypted, password protected billing statement to an E-mail address provided by the user of the account.

11. The network of claim 10, wherein:

if the E-mail to the user is bounced back, the second server is further configured to request the fourth server to send to the user a print copy of the user's billing statement, and the second server is further configured to update the database to de-enroll the user from the secure E-mail billing statement.

12. The network of claim 1, wherein:

the first server, upon receiving a de-enrollment request, is further configured to forward the de-enrollment request to the second server, and the second server, in response, is further configured to update the database to reflect the user's desire not to subscribe to the secure E-mail billing statement and forward a de-enrollment e-mail to the user.

13. The network of claim 1, wherein the account information includes an account number of the user at the Mobile Service Provider network.

14. A method for enabling a Mobile Service Provider network to provide its users with a secure Electronic Mail ("E-mail") billing statement, the method comprising steps of:

receiving, from a user and at a first server, an enrollment request for a secure E-mail billing statement, the request including an E-mail address and account information;

updating, at the first server, the account of the user to reflect that the user has requested the secure E-mail billing statement;

receiving, from the first server and at a second server, the request;

generating, at the second server, an identifier for the request;

storing, at the second server, the request along with the identifier in a table;

validating, at the second server, the E-mail address of the user by sending a validation E-mail to the provided E-mail address, the validation E-mail including the identifier;

authenticating an association between the user and the E-mail address to which the validation E-mail was sent by performing steps of:

receiving, at a third server, a response of the user to the validation E-mail sent by the second server, the response including the identifier and a password requested by the third server;

validating, at the third server, the identifier via the second server and the password via the first server; and upon successful validations of the password and identifier, forwarding from the third server a successful authentication notice of the association between the user and the E-mail address to the first server; and upon receiving the successful authentication notice of the association between the user and the E-mail address, updating, at the first server, the account of the user to reflect that the user has enrolled in the secure E-mail billing statement, and requesting the second server to inform the user of the successful enrollment in the secure E-mail billing statement.

15. The method of claim 14, further comprising:

sending, from the first server, a bill ready file to a fourth server, the bill ready file identifying accounts for which billing statements are ready and also identifying, among the identified accounts, the account that has requested to receive the secure E-mail billing statement;

forwarding, from the fourth server, the identified account that has requested to receive the secure E-mail billing statement to the second server and requesting, from the second server, an E-mail notification for the identified account that has requested to receive the secure E-mail billing statement;

receiving, at the third server and from the second server in response to the request from the fourth server, a request for an encrypted, password protected billing statement for the identified account that has requested to receive the secure E-mail billing statement; and upon receiving the encrypted, password protected billing statement from the third server, sending, from the second server, an E-mail including the encrypted, password protected billing statement to an E-mail address provided by the user of the account.

16. The method of claim 14, further comprising:

forwarding, from the first server to the second server, a de-enrollment request; and updating, at the second server and in response to the de-enrollment request, the database to reflect the user's desire not to subscribe to the secure E-mail billing statement and forwarding a de-enrollment e-mail to the user.

17. A system for enabling a Mobile Service Provider network to provide its users with a secure Electronic Mail ("E-mail") billing statement, the system comprising:

a first processing device;

a first memory storing executable instructions for causing the first processing device to (i) receive, from a user, an enrollment request for a secure E-mail billing statement, the request including an E-mail address and account information and (ii) update the account of the user to reflect that the user has requested the secure E-mail billing statement;

a second processing device;

a second memory storing executable instructions for causing the second processing device to (i) receive the request from the first processing device;

(ii) generate an identifier for the request; (iii) store the request along with the identifier in a table; and (iv) validate the E-mail address of the user by sending a validation E-mail to the provided E-mail address, the validation E-mail including the identifier;

a third processing device; and a third memory storing executable instructions for causing the third processing device to authenticate an association between the user and the E-mail address to which the validation E-mail was sent by the second processing device by performing functions to (i) receive a response of the user to the validation E-mail sent by the second processing device, the response including the identifier and a password requested by the third processing device; (ii) validate the identifier via the second processing device; (iii) validate the password via the first processing device; and (iv) upon successful validations of the password and identifier, forward a successful authentication notice of the association between the user and the E-mail address to the first processing device, wherein:

the first memory further stores instructions for causing the first processing device, upon receiving the successful authentication notice of the association between the user and the E-mail address, to (iii) update the account of the user to reflect that the user has enrolled in the secure E-mail billing statement and (iv) request the second processing device to inform the user of the successful enrollment in the secure E-mail billing statement.

18. The system of claim 17, further comprising:

a fourth processing device; and a fourth memory storing executable instructions for causing the fourth processing device to allow the users to access their billing statements, wherein:

the first memory further stores instructions for causing the first processing device to send a bill ready file to the fourth processing device, wherein the bill ready file identifies accounts for which billing statements are ready and also identifies, among the identified accounts, the account that has requested to receive the secure E-mail billing statement, the fourth memory further stores instructions for causing the fourth processing device to forward the identified account that has requested to receive the secure E-mail billing statement to the second processing device and request an E-mail notification for the identified account that has requested to receive the secure E-mail billing statement, the second memory further stores instructions for causing the second processing device, in response to the request from the fourth processing device, to request from the third processing device an encrypted, password protected billing statement for the identified account that has requested to receive the secure E-mail billing statement, and upon receiving the encrypted, password protected billing statement from the third processing device, E-mail the encrypted, password protected billing statement to an E-mail address provided by the user of the account.

19. The system of claim 17, further comprising:

the first memory further stores instructions for causing the first processing device to forward to the second processing device a de-enrollment request; and the second memory further stores instructions for causing the second processing device to update, in response to the de-enrollment request, the database to reflect the user's desire not to subscribe to the secure E-mail billing statement and forwarding a de-enrollment e-mail to the user.

* * * * *